A. J. HOFMANN.
INVERTED INCANDESCENT GAS LAMP.
APPLICATION FILED APR. 11, 1907. RENEWED JULY 19, 1909.
933,176.
Patented Sept. 7, 1909.
2 SHEETS—SHEET 1.
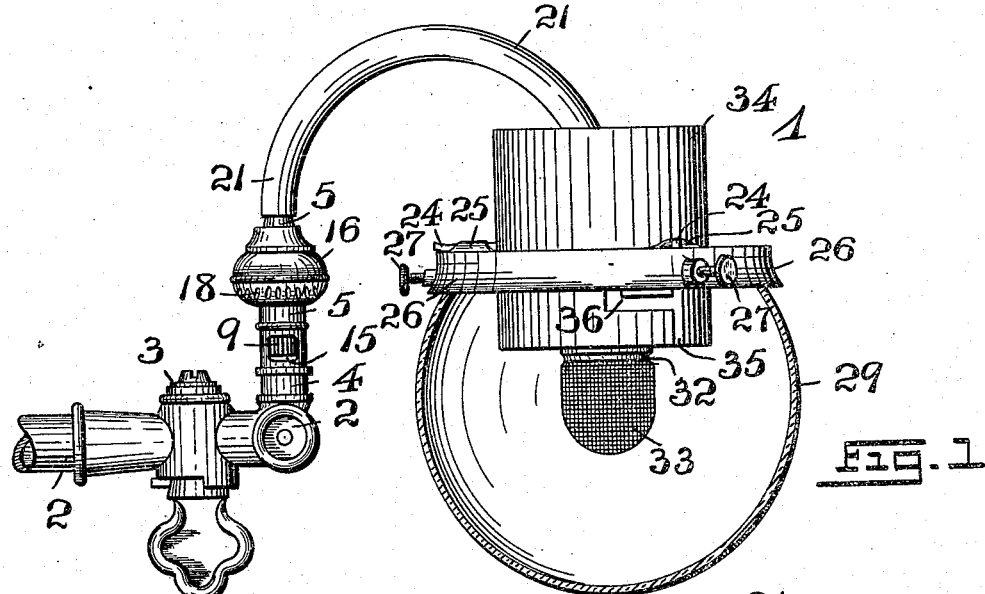
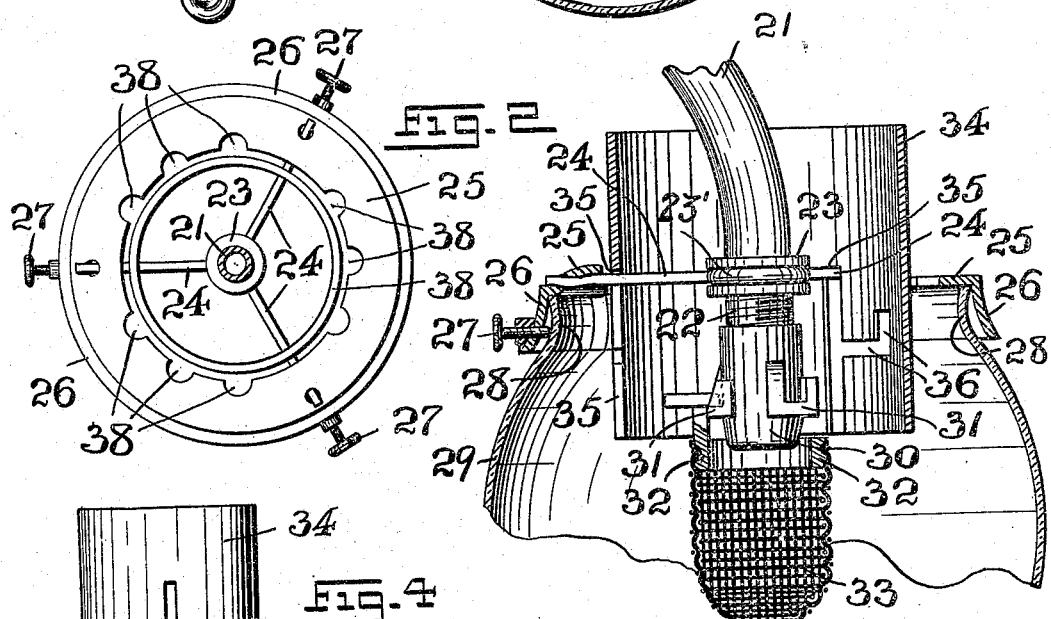
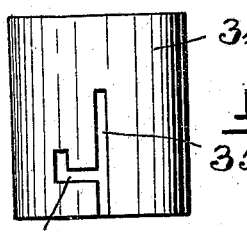
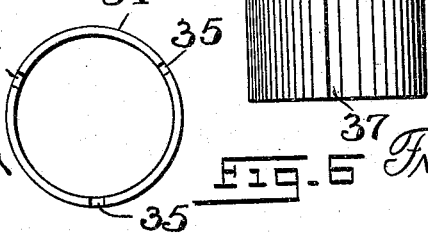
WITNESSES:
INVENTOR
Adam J. Hofmann,
BY
Fraentzel and Richards,
ATTORNEYS A. J. HOFMANN.
INVERTED INCANDESCENT GAS LAMP.
APPLICATION FILED APR. 11, 1907. RENEWED JULY 19, 1909.
933,176.
Patented Sept. 7, 1909.
2 SHEETS—SHEET 2.
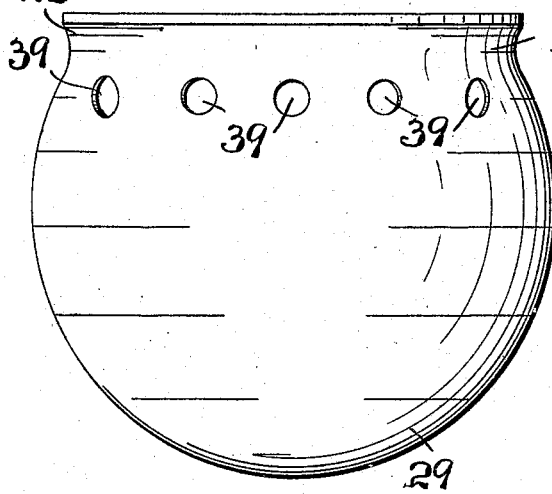
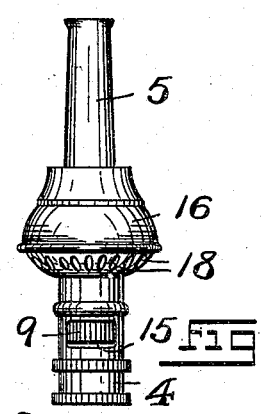
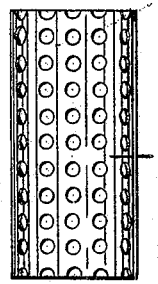
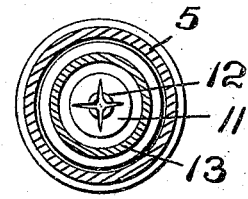
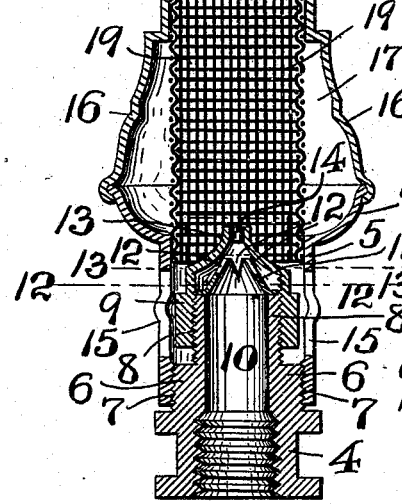
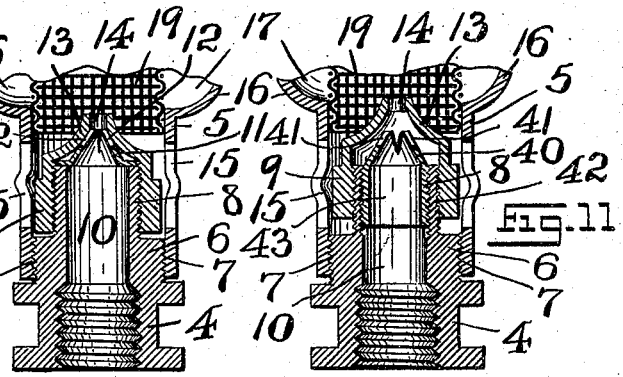
WITNESSES:
INVENTOR:
Adam J. Hofmann,
BY
Fraentzel and Richards,
ATTORNEYS

UNITED STATES PATENT OFFICE.

ADAM J. HOFMANN, OF NEWARK, NEW JERSEY.

INVERTED INCANDESCENT GAS-LAMP.

933,176. Specification of Letters Patent. Patented Sept. 7, 1909.

Application filed April 11, 1907, Serial No. 367,635. Renewed July 19, 1909. Serial No. 508,476.

*To all whom it may concern:*

Be it known that I, ADAM J. HOFMANN, a citizen of the United States, residing at Newark, in the county of Essex and State of New Jersey, have invented certain new and useful Improvements in Inverted Incandescent Gas-Lamps; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

My present invention has reference, generally, to improvements in that class of glow-lamps and burners, known in the art as inverted incandescent or glow gas-lamps; and, the invention relates, more particularly, to a novel means which is to be used with an inverted incandescent or glow gas-lamp and burner of the general character hereinafter set forth, with a view of providing a simply constructed device and novel arrangement and combination of parts, for producing a proper mixture of the air and gas before it reaches the burner-tip, thereby providing a better and more efficient gas-lamp.

The invention, therefore, has for its general purposes to provide an inverted glow or incandescent gas-lamp which can be provided with a glass globe having a closed bottom or lower portion, so as to produce a gas-lamp of this character which is safe, and which eliminates the danger of the mantle or pieces of carbon falling down upon the carpet or table-cloth, to catch fire, as is generally the case with the inverted lights using open-bottom globes.

A further object of this invention is to produce in connection with my novel lamp, a circulating element or chimney, which is used with the bottom-closed globe, and is arranged and constructed in such a manner, that, as soon as the gas is ignited, a free circulation of air or oxygen is conveyed by means of said circulating element or chimney into the interior of the globe in contact with the mantle, thus producing a thorough and complete mixture of the air and gas, the lower portion of the circulating element or chimney extending down the center of the globe and just above the mantle, thereby creating a center-draft, in the manner and for the purposes hereinafter more fully described.

A further object of this invention is to provide in connection with said air circulating medium, an element in the form of a tubular chimney, for the escape of the heat from the interior of the globe, which is adjustably disposed, by simply slipping it over the goose-neck, being provided with slots by means of which it rests upon radial arms or cross-spiders extending from the globe-holding ring, said ring being made with an inwardly extending flange, formed with openings in close juxta-position to the outer cylindrical surface of said tubular chimney, which openings allow for the influx of a constant supply of fresh air or oxygen to the burner, and an emission of the hot and expended air and gases through the interior of the tubular chimney. In lieu of the holes or openings in the flange of the globe-supporting ring, the glass globe may be provided with air-holes in its upper portion. By the provision of the circulation of cool and fresh air, at all times, the light is not affected by the direct draft produced in the open-bottom globes.

A further object of this invention is to provide in connection with the Bunsen-tube an air-check, comprising a tube provided with holes or perforations, or made of wire-mesh, which retards the sudden inflow of air when first lighting the gas, and thereby preventing the explosion or back-fire, caused in most incandescent gas-burners; and, also, to provide a mixer for producing a more proper and perfect mixture of the air and gas, before it reaches the burner-tip proper, and furthermore providing a screen or sieve which prevents any dirt and dust from collecting upon the Bunsen-tube, being capable of being slipped up through the bottom of the tube, and being capable of being taken out and readily cleaned.

A still further object of this invention is to provide in addition, a split cone-shaped regulator within the Bunsen-tube, for the purpose of providing a small round stream of gas, and a strong and direct pressure of the same, instead of the usual flat stream of gas produced by the needle-valves usually employed, thereby giving greater pressure which in inverted gas-lights is necessary to give the best results; and, furthermore, to provide a regulatable device for regulating and varying the thickness of cross-area of the stream of gas.

Other objects of this invention not at this time more particularly mentioned will be clearly understood from the following description of my present invention.

My present invention, consists, primarily, in the novel inverted glow or incandescent gas-lamp; and, furthermore, this invention consists in the general arrangements and combinations of the various devices and parts, as well as in the details of the construction of the same, all of which will be more particularly described in the following specification and then finally embodied in the clauses of the claims which are appended to and which form an essential part of this specification.

The invention is clearly illustrated in the accompanying drawings, in which:—

Figure 1 is a side elevation of a portion of a gas-bracket provided with an inverted glow or incandescent gas-lamp embodying the principles of my present invention, the glass-globe being represented in vertical section; and Fig. 2 is a top or plan view of the globe-holder, the gas-pipe being represented in horizontal section, with the globe and the mantle and mantle-holder omitted from said view. Fig. 3 is a detailed sectional representation of the globe-holder and globe, only part of the latter being represented, said view showing in elevation a portion of the gas-pipe and burner-tip, the mantle-holder, mantle and circulating element or chimney being represented in vertical section. Fig. 4 is a side elevation of one form of circulating element or chimney; Fig. 5 is a similar view of a slightly modified form of circulating element; and Fig. 6 is a bottom view of either of the devices shown in said Figs. 4 and 5. Fig. 7 is a side view of a glass-globe provided with a closed bottom, but formed in its upper portion with air-inlets or holes. Fig. 8 is a side-elevation of the Bunsen tube, in its detached relation, but which is to be attached to the gas-bracket and with which is to be connected the goose-neck. Fig. 9 is a vertical section of the Bunsen-tube and its interior parts, said section being made on an enlarged scale, the cone-shaped gas-regulator being shown with its slitted end in its normal initial position with the slitted parts wide open; Fig. 10 is a vertical section of the lower end-portion of the Bunsen-tube and the parts therein, showing the slitted parts of the cone-shaped gas-regulator in their partly closed relations to provide a reduced outlet for the gas; and Fig. 11 is a view similar to that illustrated in said Fig. 10, representing a slightly modified construction of gas-regulator and means for operating the same. Figs. 12 and 13 are two horizontal sections taken, respectively, on lines 12—12 and 13—13 in said Fig. 9; and Fig. 14 is a side view of a modified construction of air-retarding device which may be used in the Bunsen-tube in place of the wire-mesh retarding device shown in said Figs. 9, 10 and 11.

Similar characters of reference are employed in all of the above described views to indicate the corresponding parts.

Referring now to the several figures of the drawings, the reference character 1 indicates the complete inverted glow or incandescent gas-lamp embodying the principles of my present invention, the same comprising a gas-bracket, as 2, provided with the gas-cock 3. Adapted to be screwed upon the gas-bracket 2, is a base-member 4 of a Bunsen-tube 5. This said base-member 4 is provided with a screw-threaded shoulder 6 upon which the screw-threaded end 7 of the Bunsen-tube 5 is screwed to operatively connect the same thereto. The base-member 4 is furthermore provided with another screw-threaded shoulder 8, upon which is screwed the regulator or adjusting-cap 9. The said base-member 4 is of such a construction that its interior forms a tubular duct or gas-passage 10. Seated upon the upper end of and adapted to register with the said tubular-duct or gas-passage 10 of the base-member 4 is a cone-shaped regulator or element 11, which is preferably provided with upwardly extending slits or cut-away portions so as to provide the element 11 with a series of upwardly extending leaves 12, all of which have a spring-like action, so as to be capable of slight movements. The said regulator or adjusting cap 9 is arranged directly above and over said split-portions or leaves of said cone-shaped regulator 11 and is provided with a hollow-cone-shaped top 13 which is formed with a centrally disposed hole or perforation 14, adapted to permit the passage of the gas therethrough.

From an inspection of Figs. 9 to 13 inclusive, it will be readily seen, that when the regulator or adjusting cap 9 is screwed down upon the screw-threaded shoulder 8 of the base-member 4, the inner surfaces of the hollow cone-shaped top 13 may be brought in engagement with the leaves 12 of the element or regulator 11, whereby said leaves 12 may be pinched together to reduce or vary the size of the gas-passage, according to the distance which said regulator or adjusting cap 9 is screwed down; and, thereby determining just how much the size of said gas-passage is to be reduced. The Bunsen-tube 5 is provided with oppositely disposed holes or openings 15, which give access to the said regulator or adjusting-cap 9, and which serve also as a suitable means to permit the cap 9 to be reached in order to turn the same in the adjusting process above described.

The Bunsen-tube 5 is usually provided with an outwardly flaring portion 16 adapted to provide a mixing chamber 17, in which the air mixes with the gas, said outwardly flaring portion being provided on its under side with a plurality of holes or openings 18 which form the air-inlets thereto. Arranged within this said air-mixing chamber 17, over and above the gas passage or inlet above described, is a tubular wire-mesh 19, which is adapted to break up the air passing therethrough from said air-mixing chamber 17 to afford a better mixing therewith of the gas which passes up through the center of said tubular wire-mesh 19. As another means for accomplishing this same result, a perforated tubular member 20 such as is shown in Fig. 14 of the drawings, may be substituted for the wire-mesh 19. Suitably connected with the upwardly extending free-end of said Bunsen-tube 5 is the goose-neck 21, the free end of which is provided with a screw-thread 22. Suitably screwed upon the said screw-thread 22 is a hub or collar 23 which is formed with an annular depression in which is arranged a ring $23^1$. Secured to said ring and extending radially therefrom are suitable spider-arms 24 which are adapted to hold and engage with a globe-supporting-ring 25, said globe-supporting-ring being provided with a downwardly extending and preferably outwardly flaring flange 26, in which are arranged a number of holding-screws 27 which are adapted to engage with and support the flange 28 of a bottom-closed globe 29 substantially as shown in the several figures of the drawings.

Secured upon the screw-thread 22 of the goose-neck 21 is a burner-tip 30 which is provided with suitably disposed socket-members 31 upon its outer periphery, thus providing a suitable supporting means, for the supporting-ring or hanger 32 of an inverted glow or incandescent gas-lamp mantle 33.

In order to supply a proper circulation of air within and through the bottom-closed globe 29 thereby forming a center draft and direct supply of the needful oxygen around the mantle 33, for the purpose fully set forth in describing the objects of the present invention, there is provided a suitable circulating-element or chimney 34, the same being made in the form of a hollow member, preferably a cylinder or tube, the same being provided with suitably disposed receiving openings or slots 35, whereby the element 34 may be slipped over the goose-neck 21 and the bottoms of said slots 35 brought in engagement with the spider-arms 24, for the proper support of the said circulating element or chimney, in its operative position with relation to the globe 29, the burner tip and the mantle. The said slots 35 may be provided with off-shooting L-shaped slots 36 connected therewith as shown more particularly in Fig. 4 of the drawings, if it is desired to raise and support the circulating element or chimney 34 at a greater height from the mantle, or when said element 34 has to be raised for securing a new mantle in place; or, the circulating element or chimney 34 may simply be provided with the straight slot 37, as shown more particularly in Fig. 5 of the drawings.

In order to permit a free access of air into and through the bottom-closed globe 29, the globe-supporting ring 25 is provided with cut-away or open portions, as 38, which may be located in close juxta-position to the outer surface of said circulating element or chimney and thereby allow for a constant influx of fresh-air or oxygen to the burner-tip, while the expended air and gases will be drawn up and out through the center draft formed by the circulating element or chimney and thus conducted away from the mantle and burner-tip, as will be clearly evident. In this manner fresh-air or oxygen may constantly surround the same, to produce the beneficial and efficient results claimed. In lieu of these cutaway portions 38 in the globe supporting-ring 25, or in addition thereto, if desired, the closed bottom globe may be provided near its top with suitably disposed holes or openings 39, as shown more particularly in Fig. 7 of the drawings.

Referring now to Fig. 11 of the drawings, there is illustrated therein a slightly modified construction of split-cone regulator 40 which is provided with the leaves 41. In this construction, the tubular-duct or gas-passage 10 is provided with an interiorly arranged screw-thread 42, and the split-cone or regulator 40 is provided with a downwardly extending screw-threaded member 43 which is adapted to screw into the said screw-thread 42 and thereby operatively connects the said split-cone or regulator with the base-member 4 forming the gas-intake.

From the above description, it will be clearly evident that the present invention provides a novel construction of inverted glow or incandescent gas-lamp which may be used efficiently with a closed-bottom globe and which effectively accomplishes the various objects above set forth.

I claim:

1. In an inverted incandescent gas-lamp, the combination with the end-portion of a downwardly extending gas-tube, a burner-tip upon said end of the tube, said burner-tip being provided with a mantle-support, and a mantle, of a series of spider-arms radiating from said gas-tube, a globe-supporting ring mounted upon said arms, a bottom-closed globe supported from said ring, a tubular-air-circulating element carried by said arms and arranged about the gas-tip, said element being removably supported upon said arms, and being provided with means for retaining said element in a raised position upon said arms, so that the lower edge of said element can be raised and retained above said mantle-support, and means upon the outside of said tubular air-circulating element for producing a circulation of air into said globe and into and through said circulating element, substantially as and for the purposes set forth.

2. In an inverted incandescent gas-lamp, the combination with the end-portion of a downwardly extending gas-tube, a burner-tip upon said end of the tube, said burner-tip being provided with a mantle-support, and a mantle, of a series of spider-arms radiating from said gas-tube, a globe-supporting ring mounted upon said arms, a bottom-closed globe supported from said ring, a tubular air-circulating element carried by said arms and arranged about the gas-tip, said element being removably supported upon said arms, and being provided with means for retaining said element in a raised position upon said arms, so that the lower edge of said element can be raised and retained above said mantle-support, said globe-supporting ring being provided with an inwardly extending flange formed with air-inlets for producing a circulation of air into said globe and into and through said circulating element, substantially as and for the purposes set forth.

3. In an inverted incandescent gas-lamp, the combination with a gas-intake of a Bunsen-tube, a sieve-like tubular member arranged within said Bunsen-tube for causing the air entering said Bunsen-tube to be thoroughly mixed with the gas, a split cone-regulator arranged above said gas-intake, said split-cone-regulator being provided with flexible converging leaves, a hollow-cone-shaped regulator formed with an opening or gas-outlet connected with said gas-intake and adapted to screw down upon the flexible converging leaves of said split-cone regulator to pinch the same together and reduce the aperture formed thereby and diminish the flow of gas therethrough, a gas-tube extending therefrom, a burner-tip upon the end of said tube, said burner-tip being provided with a mantle-support, and a mantle, a series of spider-arms, a globe supporting ring mounted upon said arms, a bottom-closed globe depending from said globe-supporting ring, and a circulating-element adapted to cause a proper circulation or influx of air within said closed bottom globe, said element being removably supported upon said arms, and being provided with means for retaining said element in a raised position upon said arms, so that the lower edge of said element can be raised and retained above said mantle-support, substantially as and for the purposes set forth.

4. In an inverted incandescent gas-lamp, the combination with a gas-intake of a Bunsen-tube, a burner-tip, said burner-tip being provided with a mantle-support, means connected with said gas-intake for regulating the flow of gas to the burner-tip, a goose-neck tubular member connecting said Bunsen-tube with said burner-tip, a plurality of spider-arms secured upon said tubular member above the said burner-tip, a globe-supporting-ring connected with the ends of said spider-arms, a bottom-closed globe depending from said globe-supporting ring, and means connected with said spider-arms and said globe-supporting ring for producing a proper circulation or influx of air within said closed-bottom-globe, consisting of a tubular member removably supported upon said arms, and being provided with means for retaining said element in a raised position upon said arms, so that the lower edge of said element will be raised above said mantle-support, substantially as and for the purposes set forth 5. In an inverted incandescent gas-lamp, the combination with a gas-intake of a Bunsen-tube, a burner-tip, said burner-tip being provided with a mantle-support, means connected with said gas-intake for regulating the flow of gas to the burner-tip, a goose-neck tubular member connecting said Bunsen-tube with said burner-tip, a plurality of spider-arms secured upon said tubular member above the said burner-tip, a globe-supporting-ring connected with the ends of said spider-arms, a bottom-closed globe depending from said globe-supporting ring, and means connected with said spider-arms and said globe-supporting ring for producing a proper circulation or influx of air within said closed-bottom globe, comprising a circulating-element formed of a tubular member provided with suitably disposed and vertically extending slots 35 to be inserted over the said spider arms to hold the said tubular member over and around the burner-tip to produce a central draft, and said tubular member being provided with other slots extending from said slots 35 comprising the off-shooting L-shaped slots 36, whose vertically extending members are shorter than the slots 35, all being arranged so as to provide a means for retaining said tubular member in a raised position upon said arms, so that the lower edge of said member will be raised above said mantle-support, said globe-supporting ring being formed with suitably disposed cutaway portions or openings to permit the proper circulation or influx of air within said closed-bottom-globe, substantially as and for the purposes set forth.

6. In an inverted incandescent gas-lamp, the combination with a gas-intake of a Bunsen-tube, a burner-tip, said burner-tip being provided with a mantle-support, a split-cone-regulator connected with said gas-intake, a goose-neck tubular member connecting said Bunsen-tube with a burner-tip, an inverted incandescent gas-mantle connected with said burner-tip, a plurality of spider-arms secured upon said tubular-member above said burner-tip, a globe-supporting-ring connected with the ends of said spider-arms, said globe-supporting-ring being formed with cutaway portions or openings, a bottom-closed globe depending from said globe supporting-ring, and means connected with and depending from said spider-arms for producing a proper circulation or influx of air within said closed-bottom globe, comprising a circulating-element formed of a tubular member provided with suitably disposed and vertically extending slots 35 to be inserted over the said spider arms to hold the said tubular member over and around the burner-tip to produce a central draft, and said tubular member being provided with other slots extending from said slot 35 comprising the off-shooting L-shaped slots 36, whose vertically extending members are shorter than the slots 35, all being arranged so as to provide a means for retaining said tubular member in a raised position upon said arms, so that the lower edge of said member will be raised above the mantle-support, said globe-supporting-ring being formed with suitably disposed cutaway portions or opening to permit the proper circulation or influx of air within said closed bottom-globe, substantially as and for the purposes set forth.

7. In an inverted incandescent gas-lamp, the combination with the end-portion of a downwardly extending gas-tube, a burner-tip upon the end of said tube, said burner-tip being provided with a mantle-support, and a mantle, of a series of spider-arms radiating from said gas-tube, a globe-supporting ring mounted upon said arms, a bottom-closed globe supported from said ring, and an air-circulating element comprising a tubular member provided with suitably disposed and vertically extending slots 35 to be inserted over the said spider-arms to hold the said tubular member over and around the burner-tip to produce a central draft, and said tubular member being provided with other slots extending from said slot 35 comprising the off-shooting L-shaped slots 36, whose vertically extending members are shorter than the slots 35, all being arranged so as to provide a means for retaining said tubular member in a raised position upon said arms, so that the lower edge of said member will be raised above the mantle-support, substantially as and for the purposes set forth.

In testimony, that I claim the invention set forth above I have hereunto set my hand this 9th day of April, 1907.

ADAM J. HOFMANN.

Witnesses:
 FREDK. C. FRAENTZEL,
 FREDERICK JAMISON.